E. M. GARDNER.
Smoke Pipe Damper.
No. 47,293.  Patented April 18, 1865.
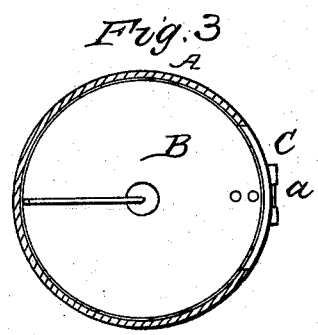
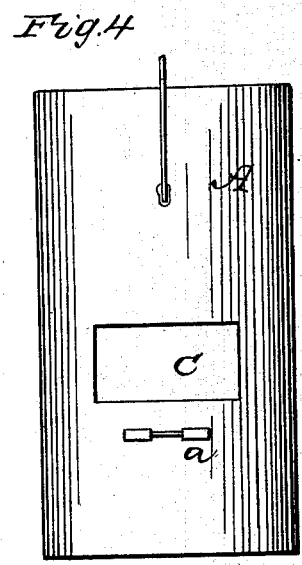
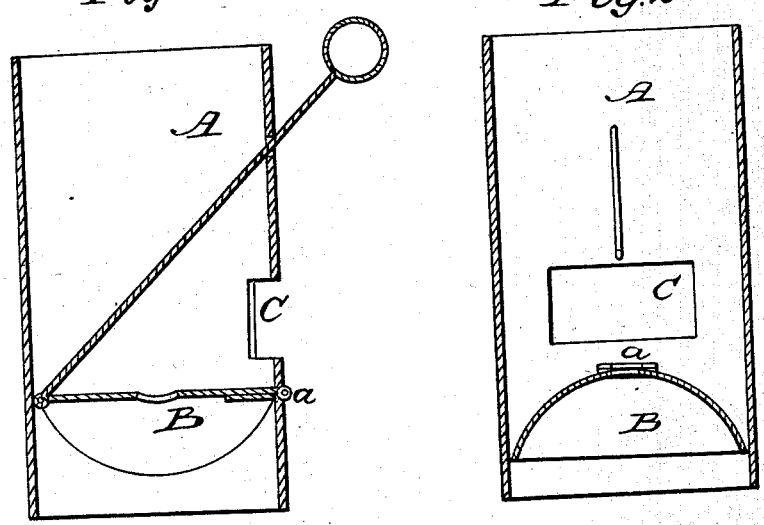
Witnesses
F. P. Hale Jr
H. E. Fisher
Inventor
Edward M. Gardner
by his attorney
R. H. Eddy

UNITED STATES PATENT OFFICE.

EDWARD M. GARDNER, OF NANTUCKET, MASSACHUSETTS.

SMOKE-PIPE DAMPER.

Specification forming part of Letters Patent No. 47,293, dated April 18, 1865.

*To all whom it may concern:*

Be it known that I, EDWARD M. GARDNER, of the town and county of Nantucket, and State of Massachusetts, have invented an Improvement having reference to Smoke-Pipes and the Dampers therefor; and I do hereby declare the same to be fully described in the accompanying drawings, of which—

Figures 1 and 2 are vertical sections of a stove-pipe with the damper and ventilating-opening applied thereto. Fig. 3 is a horizontal section of the pipe taken through the air-inlet, which is just above the damper. Fig. 4 is a side view showing such air-inlet.

In the drawings, A denotes a tube or portion of a round or cylindrical stove-pipe. B is a damper placed therein. The pipe just above the hinge $a$ of the damper has an air opening or inlet, C, formed through its side. The damper is curved, the radius of the curve being equal to that of the bore of the pipe, the same being as shown in Fig. 2, so that when the damper is turned into a vertical position or against the opening C it may practically cover the opening, so as to prevent the ingress of air through the opening and into the pipe.

When the damper is in the position denoted in Fig. 1, it will interrupt the passage of smoke through the pipe. In any position between these extremes the passage of the smoke through the pipe, as well as the entrance of air through the opening C, can take place simultaneously.

The damper is hinged to the pipe, as shown at $a$, and has an elevating-rod, $b$, extending from it and through a hole in the side of the pipe and over the opening C.

In order to enable the damper to be held at any inclination within the pipe the said elevating-rod may be provided with a series of notches or their equivalents, made in or applied to the rod.

I am aware that it is not new to so arrange a flue-valve in and with respect to a smoke-conduit and an opening in its side, that such valve may serve the double purpose of a damper to the pipe and a valve to the air-inlet. Therefore, I do not claim this. The damper in such case has been a flat plate, and the pipe or conduit, or that part of it within which the damper worked, has been square or rectangular, rather than cylindrical or round.

With my arrangement I am enabled to apply the damper in a cylindrical pipe without inserting therein a square or rectangular damper-case, the curve of the damper enabling such damper to cover the curved hole made in the side of the pipe.

I claim—

The combination of the curved damper with the round pipe and the air-inlet C, such damper being hinged to the pipe and arranged with respect to the said air-inlet in manner and so as to operate with the same and the pipe, substantially as specified.

EDWARD M. GARDNER.

Witnesses:
R. H. EDDY,
F. P. HALE, Jr.